Patented June 29, 1954

2,682,527

UNITED STATES PATENT OFFICE 2,682,527

ESTERS OF ALPHA-HYDROXYMETHYL ACRYLONITRILE AND POLYMERS THEREOF

Joseph B. Dickey and Harry W. Coover, Jr., Kingsport, Tenn., assignors to Eastman Kodak Company, Rochester, N. Y., a corporation of New Jersey No Drawing. Application February 23, 1951, Serial No. 212,498

12 Claims. (Cl. 260—77.5)

This invention relates to alpha-hydroxymethyl acrylonitrile and esters, to polymers thereof, and to a process for their preparation.

The new compounds of the invention are represented by the following structural formula:

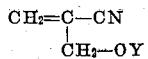

wherein Y represents an atom of hydrogen, the group

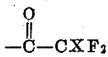

wherein X represents an atom of hydrogen or an atom of fluorine, the group

wherein R represents a monovalent hydrocarbon group such as an alkyl group containing from 1 to 4 carbon atoms (e. g. methyl, ethyl, propyl, butyl, etc. groups) and a phenyl group, and the group

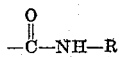

wherein R has the above meaning. The above defined compounds are colorless liquids which are soluble in common organic solvents. They can be polymerized alone or conjointly with one or more other unsaturated organic compounds to resinous polymers which are soluble in volatile organic solvents and are useful for the preparation of molded objects and coating compositions which give flexible sheets, films, spun fibers, etc.

It is, accordingly, an object of the invention to provide a new class of hydroxy- and acyloxymethacrylonitriles. Another object is to provide resinous polymers of the same. Another object is to provide a process for the preparation of the new compounds and polymers thereof. Other objects will become apparent hereinafter.

In accordance with our invention, we prepare the compound which is represented by the following formula:

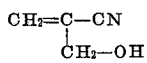

by the process of treating alpha-acetoxymethyl acrylonitrile (prepared by heating alpha-bromomethyl acrylonitrile with anhydrous sodium acetate in the presence of copper sulfate) with a hydrolyzing reagent such as an alcoholate (e. g. sodium methylate) and separating the colorless liquid alpha-hydroxymethyl acrylonitrile by distillation of the reaction mixture. An inert solvent can advantageously be employed for the reaction medium.

To obtain the compounds of our invention which are represented by the general formula:

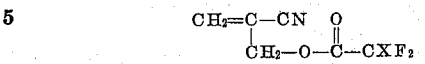

wherein X has the previously defined meaning, alpha-hydroxymethyl acrylonitrile is treated with difluoroacetic or trifluoroacetic anhydrides. The temperature of reaction can be varied over limits of about 0° to 70° C., but preferably from 0° to 20° C. While any ratio of reactants can be used, an excess of the anhydride is preferred.

To obtain the compounds of our invention which are represented by the following general formula:

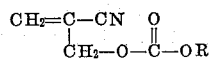

wherein R has the previously defined meaning, alpha-hydroxymethyl acrylonitrile is reacted with an aryl or alkyl chlorocarbonate (e. g. methyl, ethyl, propyl, butyl or phenyl chlorocarbonate). The products are generally clear, colorless liquids. The reaction temperature can be varied from 0° to 100° C., preferably from 10° to 30° C. An inert solvent medium can advantageously be employed.

To obtain the compounds of our invention, which are represented by the general formula:

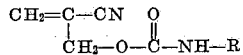

wherein R has the previously defined meaning, alpha-hydroxymethyl acrylonitrile is reacted with an aryl or alkyl isocyanate (e. g. methyl, ethyl, propyl, butyl or phenylisocyanate). The products obtained are clear, colorless compounds. Advantageously, an inert solvent can be employed for the reaction medium. The temperature of the reaction can be varied from 0° to 150° C., preferably from 50° to 100° C.

The polymerization of the new compounds of the invention alone or conjointly with one or more other unsaturated organic compounds is accelerated by heat, by actinic light and by polymerization catalysts which are known to promote the polymerization of vinyl and other unsaturated organic compounds such as peroxides e. g. benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perborates, the water-soluble salts of percarbonic acid, the water-soluble salts of perphosphoric acid, etc. The organic peroxides are especially suitable. An effective polymerization catalyst is bis-azoisobutyronitrile. Mixtures of catalysts can be employed. An activating agent such as sodium bisulfite can be used, if desired, in conjunction with the polymerization catalysts.

The polymerizations can be carried out in mass or dispersed in a non-solvent for the monomers, the particles of dispersed monomer being very small (emulsion) or relatively large (bead or granular). For emulsion polymerization, any non-solvent for the monomers can be employed, water being especially advantageous. The monomer or mixture of monomers can be advantageously emulsified in the water using emulsifying agents such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g. dimethylbenzylphenyl ammonium chloride, quaternary ammonium salts containing the radicals $C_{15}H_{31}$ and $C_{17}H_{35}$, etc.). For bead or granular polymerization relatively poor dispersing agents such as starch, methylated starch, gum arabic, polyvinyl alcohol, partly hydrolyzed polyvinyl acetate, gelatin, sodium glycolate and finely divided magnesium carbonate, etc. can be employed. Mixtures of dispersing agents can be used. In the polymerizations wherein the monomers are dispersed in non-solvents, the dispersions can be facilitated by stirring, shaking or tumbling the polymerization mixtures.

The new monomers of the invention can also be copolymerized with one or more other polymerizable unsaturated compounds containing the basic vinyl group $CH_2=CH-$ to give high molecular weight resinous polymers, for example, any of the new compounds with vinyl esters of carboxylic acids (e. g. vinyl acetate, vinyl butyrate, vinyl stearate, vinyl trifluoroacetate, vinyl benzoate, etc.), vinyl alkyl ketones (e. g. methyl vinyl ketone, ethyl vinyl ketone, trifluoromethyl vinyl ketone, etc.), vinyl alkyl ethers (e. g. methyl vinyl ether, ethyl vinyl ether, vinyl-$\beta$-trifluoroethyl ether, etc.), vinyl sulfonamides (e. g. vinyl sulfonamide, N-methylvinyl sulfonamide, N-ethyl vinyl sulfonamide, etc.), vinyl halides (e. g. vinyl chloride, vinyl bromide and vinyl fluoride), vinyl alkyl sulfones (e. g. vinyl methyl sulfone, vinyl ethyl sulfone, etc.), vinyl urethanes (e. g. vinyl methyl urethane, vinyl ethyl urethane, etc.), cyclic vinyl imides (e. g. vinyl succinimide, vinyl phthalimide, etc.), acrylic acid and its anhydride, amide, N-alkyl amides, nitrile, and the methyl, ethyl, butyl, benzyl and phenyl esters, alpha-acetoxyacrylonitrile, vinylidene dichloride, vinylidene chloride-fluoride, alkyl esters of maleic and fumaric acids such as methyl maleate, methyl fumarate, fumaronitrile, cis- and trans-$\beta$-cyano and carboxamido-methyl acrylate, and the like. The polymers and copolymers of the invention are soluble in one or more volatile solvents including acetone, methyl ethyl ketone, acetonitrile, dimethyl formamide, dimethyl acetamide, etc.

The copolymers of the invention can contain variable amounts of each comonomer and are obtained with starting polymerization mixtures containing from 5 to 95% by weight of the new unsaturates and from 95 to 5% by weight of the above mentioned other unsaturated organic compounds. The copolymers have been found to contain substantially the same proportion of substituents as employed in the polymerization mixtures. The temperature of the polymerizations can be varied widely. Where a polymerizing activating agent is employed, the polymerization will take place at a temperature as low as 0° C. However, the preferred temperature range for the polymerizations is from 25° to 130° C. Where the polymerization is carried out in a solvent or in suspension in a non-solvent, the monomers advantageously constitute from 5 to 50% by weight of the mixture.

The following examples will serve to illustrate further our new unsaturates, polymers thereof, and the manner of preparing the same.

*Example 1.—Alpha-hydroxymethyl acrylonitrile*

25 g. of alpha-acetoxymethylacrylonitrile were dissolved in 200 cc. of methanol and hydrolyzed with sodium methylate, the usual precautions being taken to exclude air and to prevent polymerization. The product was recovered by partial evaporation, followed by filtration to remove sodium acetate, after which the product was separated by vacuum distillation. The product obtained was $\alpha$-hyroxymethyl acrylonitrile, a clear, colorless liquid, B. P. 35–38° C./1 mm. pressure.

*Example 2.—Methylurethane of alpha-hydroxymethyl acrylonitrile*

8.3 g. (0.1 mol) of alpha-hydroxymethyl acrylonitrile were mixed with an equivalent amount of methylisocyanate and the mixture warmed on a steam bath. When the reaction was complete, the mixture was distilled to give methylurethane of alpha-hydroxymethyl acrylonitrile ($CH_2=C(CN)-CH_2OCONHCH_3$) a clear, colorless liquid, B. P. 49°–52° C./1 mm.

In place of the methylisocyanate, there can be substituted an equivalent amount of phenylisocyanate to give the phenylurethane of alpha-hydroxymethyl acrylonitrile, ethylisocyanate to give the ethylurethane of alpha-hydroxymethyl acrylonitrile or acetamino-methylisocyanate to give the acetaminourethane of alpha-hydroxymethyl acrylonitrile.

*Example 3.—Methylcarbonate of alpha-hydroxymethyl acrylonitrile*

16.6 g. (0.2 mol) of alpha-hydroxymethyl acrylonitrile were dissolved in 100 cc. of ether and 20 g. of dry pyridine were added. Then 20 g. (0.21 mol) of methyl chlorocarbonate were slowly added dropwise and the mixture then warmed with stirring. The mixture was filtered to remove pyridine hydrochloride and the filtrate washed with water and distilled under reduced pressure. The product was methylcarbonate of alpha-hydroxymethyl acrylonitrile $$(CH_2=C(CN)-O.CO.OCH_3)$$

was a clear colorless liquid, B. P. 49°–52° C./1 mm.

By substituting other chlorocarbonates for the methyl chlorocarbonate in the above example, there are obtained corresponding esters of alpha-hydroxymethyl acrylonitrile, for example, ethyl chlorocarbonate gives the ethylcarbonate of alpha-hydroxymethyl acrylonitrile, propyl chlorocarbonate gives the propylcarbonate of alpha-hydroxymethyl acrylonitrile, butyl chlorocarbonate gives the butylcarbonate of alpha-hydroxymethyl acrylonitrile and phenylchlorocarbonate gives the phenylcarbonate of alpha-hydroxymethyl acrylonitrile.

*Example 4.—Trifluoroacetate of alpha-hydroxymethyl acrylonitrile*

16.6 g. (0.2 mol) of alpha-hydroxymethyl acrylonitrile and 4.5 g. (0.21 mol) of trifluoroacetic anhydride were mixed in the cold and then warmed to 50° C. with the exclusion of oxygen. The mixture was poured into water, and the water solution extracted with ether. The ether extract was then washed with water and distilled under reduced pressure. The product obtained was a clear, colorless liquid of trifluoroacetate of alpha-hydroxymethyl acrylonitrile

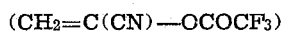

$(CH_2=C(CN)—OCOCF_3)$

B. P. 30°-31° C./1 mm.

The corresponding difluoroacetate of alpha-hydroxymethyl acrylonitrile is prepared by substituting difluoroacetic anhydride for the trifluoroacetic anhydride in the above example.

*Example 5.—Poly - alpha - hydroxymethyl acrylonitrile*

5 g. of alpha-hydroxymethyl acrylonitrile and 0.1 g. of benzoyl peroxide were placed in a sealed tube and heated at 70° C. for a period of 24 hours. A clear, soft polymer which was soluble in dimethyl formamide was obtained.

*Example 6.—Polymeric methylurethane of alpha-hydroxymethyl acrylonitrile*

10 g. of methylurethane of alpha-hydroxymethyl acrylonitrile and 0.2 g. of acetyl peroxide were placed in a sealed tube and heated at 60° C. for 48 hours. A clear, hard polymer was obtained. It was soluble in acetone, methyl ethyl ketone, acetonitrile, and similar volatile ketone solvents.

*Example 7.—Polymeric methylcarbonate of alpha-hydroxymethyl acrylonitrile*

10 g. of methyl carbonate of alpha-hydroxymethyl acrylonitrile and 0.3 g. of bis-azoisobutyronitrile were placed in a sealed tube and heated at 80° C. for a period of 24 hours. A clear, hard polymer, soluble in acetone, was obtained.

*Example 8.—Poly-alpha-hydroxymethyl acrylonitrile trifluoroacetate*

10 g. of alpha-hydroxymethyl acrylonitrile trifluoroacetate and 0.2 g. of benzoyl peroxide were heated together at 80° C. for 48 hours. A clear, hard polymer, soluble in acetonitrile and in dimethyl formamide, was obtained.

*Example 9.—Copolymer of methyl carbonate of alpha-hydroxymethyl acrylonitrile and alpha-hydroxymethyl acrylonitrile trifluoroacetate*

5 g. of methyl carbonate of alpha-hydroxymethyl acrylonitrile, 5 g. of alpha-hydroxymethyl acrylonitrile trifluoroacetate and 0.3 g. of benzoyl peroxide were placed in a sealed tube and heated at 80° C. for a period of 24 hours. A clear, hard, moldable polymer, soluble in acetone and in acetonitrile, was obtained.

*Example 10.—Copolymer of methyl urethane of alpha-hydroxymethyl acrylonitrile and methyl acrylate*

7.5 g. of methyl urethane of alpha-hydroxymethyl acrylonitrile, 2.5 g. of methyl acrylate and 0.3 g. of benzoyl peroxide were placed in a sealed tube and heated at 80° C. for 24 hours. A clear, soft polymer was obtained. It was soluble in acetone and in acetonitrile.

*Example 11.—Copolymer of alpha-hydroxymethyl acrylonitrile and acrylonitrile*

10 g. of alpha-hydroxymethyl acrylonitrile, 8 g. of acrylonitrile, 0.2 g. of sodium bisulfite and 2 g. of potassium laurate were added to 100 cc. of distilled water. Polymerization began immediately and was complete within 6 to 8 hours at room temperature. The polymer precipitated from solution and was isolated by filtration. The polymer was soluble in dimethyl formamide and in dimethyl acetamide. It had a softening point above 180° C.

*Example 12.—Copolymer of methylcarbonate of alpha-hydroxymethyl acrylonitrile and styrene*

4 g. of methylcarbonate of alpha-hydroxymethyl acrylonitrile and 6 g. of styrene were added to 50 cc. of distilled water containing one gram of potassium laurate, 0.2 g. of potassium persulfate and 0.2 g. of sodium bisulfite. Polymerization was carried out by heating at 50° C. for a period of 12 hours. The polymer was precipitated by the addition of a saturated salt solution. The polymer was soluble in methyl ethyl ketone.

*Example 13.—Copolymer of alpha - hydroxymethyl acrylonitrile trifloroacetate and vinyl acetate*

8 g. of alpha-hydroxymethyl acrylonitrile trifluoroacetate and 2 g. vinyl acetate were added to 5 cc. of distilled water containing one gram of potassium laurate and 0.3 g. of benzoyl peroxide. The polymerization was carried out by heating to 70° C. for 12 hours. The polymer was precipitated by the addition of a saturated salt solution. The polymer was soluble in acetone and in acetonitrile.

Other copolymers can be prepared by proceeding as shown in the foregoing examples, for example, from monomeric mixtures containing 5%, 10%, 30%, 60%, 70%, 90% or 95%, by weight, of the total unsaturates, of one or more of the new substituted methacrylonitriles of the invention, the remainder of the unsaturates in the mixtures being selected from one or more of the other unsaturates mentioned as suitable for preparing resinous copolymers.

As indicated previously, the homopolymers and copolymers prepared in accordance with the invention are all soluble in one or more of the common volatile solvents to viscous solutions which can also have incorporated therein suitable fillers, conditioning agents, dyes, etc., depending on the intended use of such viscous solutions. From such viscous solutions or dopes, the polymers can be obtained in the form of flexible filaments by extrusion through a spinneret and subsequently spun into yarn. Such dopes can also be coated on a film-forming surface such as metal, glass, etc., the solvent evaporated and the resulting film stripped from the film-forming surface. The new polymers can also be molded, with or without plasticizers, fillers, coloring matter, etc., by means of extrusion, injection or compression methods into shaped objects which can be worked into finished form by heat and mechanical means.

What we claim is:

1. A substituted methacrylonitrile represented by the general structural formula:

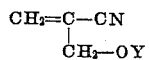

wherein Y represents a member selected from the group consisting of the group

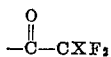

wherein X represents a member selected from the group consisting of an atom of hydrogen and an atom of fluorine, the group

wherein R represents a member selected from the group consisting of an alkyl group containing from 1 to 4 carbon atoms and a phenyl group, and the group

wherein R has the above definition.

2. Methylurethane of alpha-hydroxymethyl acrylonitrile.

3. Methylcarbonate of alpha-hydroxymethyl acrylonitrile.

4. Alpha-hydroxymethyl acrylonitrile trifluoroacetate.

5. A polymer of a substituted methacrylonitrile represented by the general structural formula:

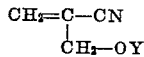

wherein Y represents a member selected from the group consisting of the group

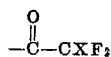

wherein X represents a member selected from the group consisting of an atom of hydrogen and an atom of fluorine, the group

wherein R represents a member selected from the group consisting of an alkyl group containing from 1 to 4 carbon atoms and a phenyl group, and the group

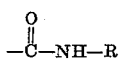

wherein R has the above definition.

6. A copolymer of from 5 to 95% by weight of methylurethane of alpha-hydroxymethyl acrylonitrile and from 95 to 5% by weight of methyl acrylate.

7. A copolymer of from 5 to 95% by weight of methylcarbonate of alpha-hydroxymethyl acrylonitrile and from 95 to 5% by weight of styrene.

8. A copolymer of from 5 to 95% by weight of alpha-hydroxymethyl acrylonitrile trifluoroacetate and from 95 to 5% by weight of vinyl acetate.

9. Phenylurethane of alpha-hydroxymethyl acrylonitrile.

10. Phenylcarbonate of alpha-hydroxymethyl acrylonitrile.

11. Polymeric methylurethane of alpha-hydroxymethyl acrylonitrile.

12. Polymeric methylcarbonate of alpha-hydroxymethyl acrylonitrile.

References Cited in the file of this patent

UNITED STATES PATENTS

| Number | Name | Date |
|---|---|---|
| 2,601,659 | Hearne et al. | June 24, 1952 |

OTHER REFERENCES

Page 10061, Chem. Abstracts, Subject Index, vol. 43, 1949.